United States Patent [19]

Suzuki

[11] Patent Number: 5,579,078

[45] Date of Patent: Nov. 26, 1996

[54] CAMERA WITH VISUAL AXIS DETECTION EQUIPMENT

[75] Inventor: Kenji Suzuki, Kawasaki, Japan

[73] Assignee: Canon Kabushiki Kaisha, Tokyo, Japan

[21] Appl. No.: 443,687

[22] Filed: May 18, 1995

Related U.S. Application Data

[63] Continuation of Ser. No. 144,605, Nov. 1, 1993, abandoned, which is a continuation of Ser. No. 766,348, Sep. 27, 1991, abandoned.

[30] Foreign Application Priority Data

Sep. 29, 1990 [JP] Japan .................................. 2-260837
Sep. 29, 1990 [JP] Japan .................................. 2-260838
Sep. 29, 1990 [JP] Japan .................................. 2-260839

[51] Int. Cl.$^6$ ............................................... G03B 13/36
[52] U.S. Cl. .......................... 396/51; 396/121; 396/283
[58] Field of Search ........................... 354/400, 62, 219, 354/402, 403, 404, 406, 409, 410, 412; 351/210; 348/78

[56] References Cited

U.S. PATENT DOCUMENTS

| | | | |
|---|---|---|---|
| 4,436,388 | 3/1984 | Takahashi et al. | 354/62 X |
| 4,574,314 | 3/1986 | Weinblatt | 358/227 |
| 4,766,302 | 8/1988 | Ishida et al. | 250/201 |
| 4,792,819 | 12/1988 | Akashi | 354/409 X |
| 4,812,912 | 3/1989 | Iida et al. | 358/227 |
| 4,836,670 | 6/1989 | Hutchinson | 354/62 X |
| 4,954,701 | 9/1990 | Suzuki et al. | 250/201 |
| 4,992,817 | 2/1991 | Aoyama et al. | 354/403 |
| 4,994,843 | 2/1991 | Kitazawa | 354/409 |
| 5,036,347 | 7/1991 | Tsunekawa et al. | 354/400 |
| 5,165,165 | 11/1992 | Aoki et al. | 29/838 |
| 5,182,443 | 1/1993 | Suda et al. | 250/201.2 |
| 5,214,166 | 5/1993 | Manser et al. | 549/510 |
| 5,214,466 | 5/1993 | Nagano et al. | 354/402 |
| 5,225,862 | 7/1993 | Nagano et al. | 354/62 |
| 5,245,371 | 9/1993 | Nagano et al. | 354/62 |
| 5,253,008 | 10/1993 | Konishi et al. | 354/402 |
| 5,280,312 | 1/1994 | Yamada et al. | 351/211 |
| 5,296,888 | 3/1994 | Yamada | 354/402 |
| 5,298,927 | 3/1994 | Konishi et al. | 351/211 |
| 5,317,629 | 5/1994 | Watanabe | 379/93 |
| 5,365,302 | 11/1994 | Kodama | 354/403 |
| 5,386,253 | 1/1995 | Fielding | 348/745 |
| 5,422,700 | 6/1995 | Suda et al. | 354/402 |
| 5,455,654 | 10/1995 | Suzuki | 354/402 |
| 5,485,241 | 1/1996 | Irie et al. | 354/410 |
| 5,486,892 | 1/1996 | Suzuki et al. | 354/402 |

FOREIGN PATENT DOCUMENTS

| | | |
|---|---|---|
| 61-61135 | 3/1986 | Japan . |
| 1-241511 | 9/1989 | Japan . |
| 1-274736 | 11/1989 | Japan . |

*Primary Examiner*—W. B. Perkey
*Attorney, Agent, or Firm*—Fitzpatrick, Cella, Harper & Scinto

[57] ABSTRACT

A camera with an optical system and having a visual axis detection device includes observing structure for observing an object, and circuitry for detecting a visual axis of an observer looking into the observing structure. Circuitry is provided for detecting a focus condition of each of a plurality of different positions in a photographing field of view, and for outputting a plurality of focus signals respectively corresponding to the plurality of detected focus conditions. Circuitry is also provided for obtaining a focus result from a focus signal which corresponds to the position in the field of view looked at by observer as detected by the detecting circuitry. Circuitry is also provided for preparing a focus adjustment signal based on the focus result obtained by the obtaining circuitry. Finally, prohibition circuitry is provided for preparing a prohibit signal to prohibit a focus adjustment operation of the optical system, the prohibit signal being based on an output from either one of the circuitry for detecting the direction of the visual axis and the circuitry for detecting the focus condition.

53 Claims, 12 Drawing Sheets

CAMERA WITH VISUAL AXIS DETECTION EQUIPMENT

This application is a continuation of application Ser. No. 08/144,605 filed Nov. 1, 1993, now abandoned, which is a continuation of application Ser. No. 07/766,348 filed Sep. 27, 1991, abandoned.

BACKGROUND OF THE INVENTION

1. Field of the Invention

The present invention relates to a camera having focus detection means and visual axis detection means, and more particularly to a camera, such as a photographing camera, a video camera, an SV camera, etc., in which the visual axis detection means detects a direction of a visual axis of an observer looking into a viewfinder, to thereby determine a targeting direction and a targeting spot in the finder view. The focus detection means has a function of detecting in-focus states in a plurality of areas based on signals obtained by the visual axis detection means, and one of plural in-focus signals obtained by the focus detection means is selected to adjust the in-focus state of a photographing system.

2. Related Background Art

There have heretofore been proposed a variety of cameras in which visual axis detection means provided in the camera senses a direction of the visual axis of a photographer to detect an area (position) in a viewfinder which the photographer is observing, i.e., a so-called targeting direction of the photographer, and various photographing functions such as automatic focus adjustment and automatic exposure setting are controlled in response to a signal from the visual axis detection means.

Japanese Patent Laid-Open No. 61-61135 and U.S. Pat. No. 4,574,314, for example, propose a camera wherein the distance measuring direction of a focus detector is mechanically controlled in response to an output signal from the visual axis detection means, for adjusting the in-focus state of a photographing system.

The assignee of the present application has proposed, in Japanese Patent Laid-Open No. 1-241511, a camera which comprises visual axis detection means for detecting a targeting direction of a potographer, focus detection means having a plurality of distance measuring views, and automatic exposure control means having plural distribution patterns of light measuring sensitivity, whereby driving of the focus detection means and the automatic exposure control means are controlled in response to an output signal from the visual axis detection means.

While photographing conditions such as focus adjustment and exposure control have been automatically set in a prior camera by using a central area of the viewfinder as a reference, the camera proposed in the above Japanese Patent Laid-Open No. 1-241511 enables the photographer to select an arbitrary area (or multiple areas in some cases) within the viewfinder at his or her discretion for carrying out the focus adjustment, the exposure control, etc. based on the selected area. Accordingly, a photo can be taken under free conditions intended by the photographer, apart from a method of automatically controlling the composition which is the most important factor in photographing.

The automatic focus detecting technique conventionally used in cameras are divided into two main categories; a passive type that utilizes natural light coming from an object, and an active type that projects a light beam to an object from the camera and utilizes the reflected light from the object.

The passive type technique further includes a contrast detection type that measures sharpness of an object image, and a correlation type that photoelectrically detects a match of a double object image based on the principles of triangulation. In any of passive type techniques, a distribution pattern of the light intensity over the object surface is measured and an image analysis is carried out from the measured result for focus detection. Accordingly, if the object has extremely low brightness or extremely low contrast, there cannot be obtained a satisfactory distribution pattern of the light intensity as a basis for the image analysis, resulting in the focus detection failing to operate or the detecting accuracy being reduced.

On the other hand, the active type technique also has a problem in that the focus detection fails to operate or the detecting accuracy is reduced for the following reasons:

(A) If the object surface has low reflectance, the reflected light intensity is too low;
(B) If any object of high brightness exists in the surroundings, it becomes difficult to discriminate the reflected component of the projected light from the object; and
(C) If the distance to the object is long, the reflected component of the projected light is reduced.

Thus, any of the focus detection techniques has suffered from the problem that the focus detection may fail to operate or the detecting accuracy may be reduce.

Accordingly, even if a focus detection area (distance measuring point) is set based on a signal corresponding to the targeting direction of the photographer (the signal being obtained by the visual axis detection means provided on a camera), an infocus signal for that area cannot be produced or, otherwise, is produced with low reliability depending on the circumstances.

Another problem is that in the case of automatic focus detection, the detection is disabled, or, in the case of an object pattern which causes substantial detection errors, an infocus signal cannot be obtained when the targeting direction of the photographer is put toward such an object.

Meanwhile, as regards the visual axis detection means, a photographer usually tends to look at the background or surrounding objects as well as the main object to be photographed. For this reason, the true targeting direction (targeting spot) must be identified from a motion of the visual axis direction of the photographer over time. However, the detection of the visual axis becomes difficult depending on motions of the visual axis, and the detection accuracy of the visual axis is lowered under the presence of strong images or noise due to extraneous light in a detection optical system. This makes it very difficult to detect the targeting direction in the viewfinder from the direction of visual axis of the photographer.

On the other hand, automatic focus detection means in recent cameras has a frame area for distance measurement which does not always cover the entire frame to be photographed, and sets a plurality of distance measuring fields of view in a part of the photographed frame in many cases. Stated otherwise, because a main object is seldom located in an edge of the frame, an automatic focus detection area is set in a central region of the frame, excepting four corners thereof, in area proportion of approximately 1/10 to 1/2 for the entire frame.

In a camera thus constituted, if the targeting direction of a photographer is outside the focus detection area, the focus detection cannot be effected.

Where the distance measuring fields of view are apart from one another, such a failure also occurs in an intermediate area between the fields of view.

Moreover, conventional cameras are designed to simply move an object area for the automatic focus detection depending on a motion of the visual axis direction of a photographer. No considerations have so far been paid to the ability to cope with the event that the focus detection means and/or the visual axis detection means partially fails to detect, or wherein a mismatch occurs in the process of control.

Accordingly, even those cameras which include the focus detection means and the visual axis detection means have produced problems wherein desired functions of such cameras cannot be fully effected in some cases.

SUMMARY OF THE INVENTION

A main object of the present invention is to provide an optical device with focus detection means and visual axis detection means in which, when it is determined that the focus detection means and/or the visual axis detection means causes a detection error, or that a reliable signal cannot be obtained therefrom, the optical device is controlled to prohibit a predetermined operation or to perform another operation so that the optical device can always achieve its functions in a satisfactory state.

A secondary object of the present invention is to provide a camera with focus detection means and visual axis detection means in which, when it is determined that the focus detection means and/or the visual axis detection means fails to detect, or that a reliable signal cannot be obtained therefrom, an operation mode is switched over from a first operation mode of taking a photo based on signals from those means to a predetermined second operation mode so that the camera can always achieve its photographing functions in a satisfactory state.

According to the present invention, a camera comprises visual axis detection means for detecting a targeting direction of a photographer looking into a viewfinder of the camera, focus detection means for detecting in-focus states in a plurality of areas within the viewfinder of a photographing system, selection means for selecting one of plural infocus signals, obtained by the focus detection means, in response to a signal obtained by the visual axis detection means, adjusting means for adjusting the in-focus state of the photographing system in response to the signal from the selection means, and prohibition means for prohibiting operation of the adjusting means depending on at least one of the two output signals, i.e., the signal from the visual axis detection means and the signal from the focus detection means.

In the above arrangement, (I) when it is determined that the one in-focus signal selected by the selection means cannot be used, the prohibition means is operated; (II) when it is determined that the visual axis detection means cannot detect the targeting direction, or that reliability of the signal obtained by the visual axis detection means is low, the prohibition means is operated; (III) when it is determined that the targeting direction obtained by the visual axis detection means is not present in any of the plural detection areas within the viewfinder to be detected by the focus detection means, the prohibition means is operated; and (IV) light emitting means or/and sound producing means provided on the camera are operated in interlock fashion with the operation of the prohibition means.

Further, according to the present invention, the camera includes a first operation mode in which the in-focus state of the photographing system is adjusted by the adjusting means in response to the signal from the selection means, and a second operation mode in which any one of the plural in-focus signals obtained by the focus detection means is selected independently of the signal obtained by the visual axis detection means, causing the adjusting means to adjust the in-focus state of the photographing system.

In the above arrangement, (I') when it is determined by judging means that the one in-focus signal selected by the selection means cannot be used, the second operation mode is taken; (II') when it is determined by judging means that the visual axis detection means cannot detect the targeting direction, or that reliability of the signal obtained by the visual axis detection means is low, the second operation mode is taken; and (III') when it is determined by judging means that the targeting direction obtained by the visual axis detection means is not present in any of the plural detection areas within the viewfinder to be detected by the focus detection means, the second operation mode is taken.

Moreover, according to the present invention, the second operation mode is carried out such that any one of the plural in-focus signals obtained by the focus detection means is selected in response to an auxiliary signal which has a predetermined relationship with respect to the signal obtained by the visual axis detection means, causing the adjusting means to adjust the in-focus state of the photographing system.

In the above arrangement, (I") when it is determined by judging means that the one in-focus signal selected by the selection means cannot be used, the second operation mode is taken; (II") the auxiliary signal is a signal related to a targeting direction in a distance measuring area adjacent the distance measuring area which contains the targeting spot based on the signal obtained by the visual axis detection means; and (III") when it is determined by judging means that the targeting direction obtained by the visual axis detection means is not present in any of the plural detection areas within the viewfinder to be detected by the focus detection means, the second operation mode is taken.

DETAILED DESCRIPTION OF THE PREFERRED EMBODIMENTS

Figure 1:
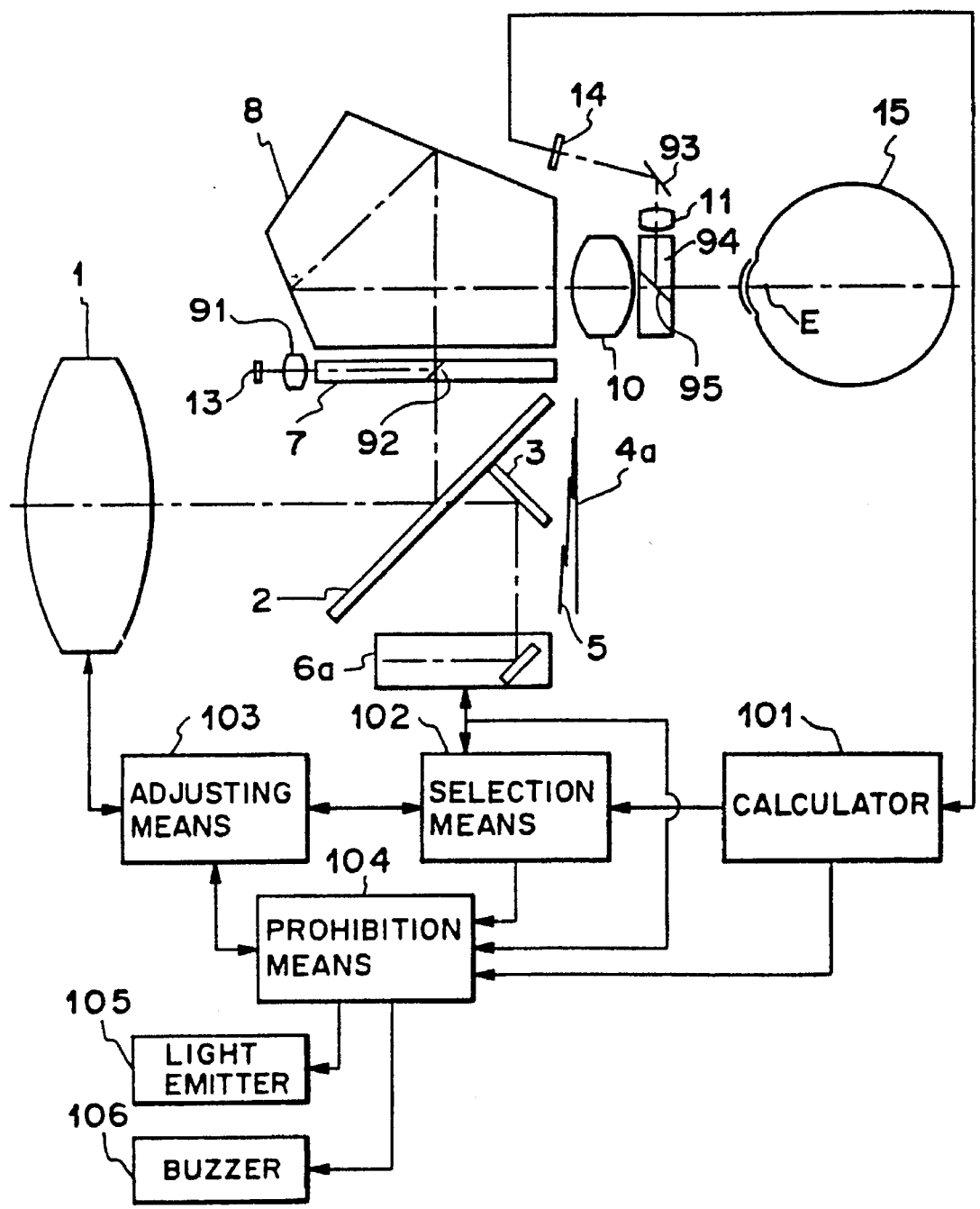
FIG. 1 is an optical sectional view of a first embodiment in which the present invention is applied to a single-lens reflex camera.
Figure 2:
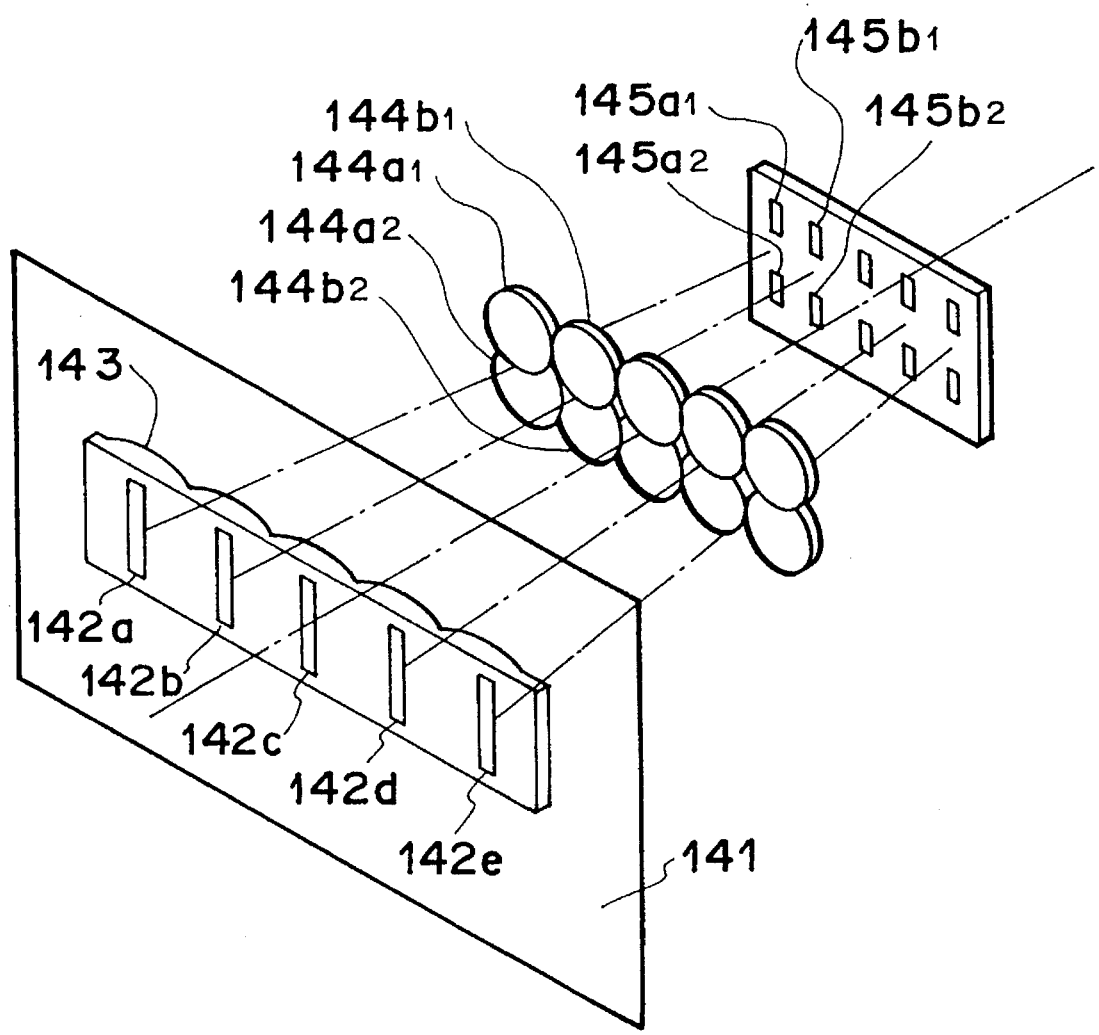
FIG. 2 is an explanatory view of part of FIG. 1.

FIG. 1 is an optical sectional view of a first embodiment in which the present invention is applied to a single-lens reflex camera, and FIG. 2 is an explanatory view of part of FIG. 1.

In FIG. 1, denoted by reference numeral 10 is an eyepiece, and 94 is an optical block. A dichroic mirror 95 transparent to visible rays but translucent to infrared rays is obliquely disposed in the optical block 94 and doubles as an optical beam splitter. 11 is a light receiving lens, 93 is a mirror, and 14 is an array of photoelectric transducers. The light receiving lens 11 and the photoelectric transducer array 14 are components of light receiving means. The photoelectric transducer array 14 is usually a device comprising a plurality of photoelectric transducers one-dimensionally arrayed in a direction perpendicular to the drawing sheet. If necessary, however, a device comprising a plurality of photoelectric transducers two-dimensionally arranged may be used instead.

Denoted by 13 is a light source such as light emitting diode for infrared ranging. 91 is a projection lens and 7 is a focusing plate in which a light splitting plane 92 is obliquely disposed. The light splitting plane 92 is in the form of a half-mirror or a dichroic mirror.

In FIG. 1, infrared rays from the light source 13 are condensed by the projection lens 91 and introduced into the focusing plate 7 to be reflected by the light splitting surface 92, followed by entering the eyepiece 10 via a pentaprism 8. The infrared rays entering and then emerging from the eyepiece 10 pass through the dichroic mirror 95 and illuminate an eyeball 15 of an observer positioned near an eye point E. The infrared rays reflected by the eyeball 15 are reflected by the dichroic mirror 95 and further reflected by the mirror 93 while being condensed by the light receiving lens 11, so that a Purkinje image due to reflection from the eyeball, for example, is formed on the photoelectric transducer array 14.

Using signals from the photoelectric transducer array 14, a calculator 101 determines not only a visual axis direction of the eyeball 15 of a photographer, but also a targeting direction and a targeting spot in the viewfinder.

Since a visual axis detection method in this embodiment is explained in detail in Japanese Patent Laid-Open No. 1-241511 and No. 1-274736, for example, which have been previously proposed by the present assignee, and is not the gist of the present invention, a detailed description of the method will be omitted here.

In this embodiment, the above mentioned members 10, 11, 13, 14, 91, 94 and 101 are components of visual axis detection means. Denoted by 1 is a photographing lens (also referred to as an objective lens) which is fixedly or detachably attached to a camera body, 2 is a quick return mirror, and 3 is a submirror tiltably attached to the quick return mirror 2. 4 is a photosensitive surface (image surface) and 5 is a shutter. 6a is focus detection means which has the so-called multi-focus detecting function to detect in-focus states at a plurality of positions (areas) in the viewfinder.

Denoted by 102 is selection means for selecting any one of plural focus detection signals (e.g., infocus signals) sent from the focus detection means 6a and corresponding to a plurality of distance measuring areas, in response to a signal related to the targeting direction obtained by the calculator 101 as one component of the visual axis detection means. Alternatively, only a focus detection partial system corresponding to an associated distance measuring area of the focus detection means 6 may be operated in response to the signal related to the targeting direction for producing the focus detection signal.

Denoted by 103 is an adjusting (control) means which drives a focus adjusting portion (not shown) of the photographing system 1 in response to the focus detection signal from the selection means 102, thereby adjusting the in-focus state. 104 is prohibition means which prohibits operation of the adjusting means 103 in response to one of the output signal from the calculator 101 as one component of the visual axis detection means and the output signal from the focus detection means 6a. Note that those components from the calculator 101 to the prohibition means 104 are usually constituted by a microcomputer. 105 is light emitting means (light emitter) which has a light source and a drive circuit, for lighting up an indicator lamp and/or an alarm lamp based on the operation of the prohibition means 104. 106 is sound producing means (buzzer) for actuating a buzzer driver based on the operation of the prohibition means 104. The light source of the light emitting means 105 is usually disposed near the focusing plate 7 so as to be seen through the finder.

The focus detection means 6a in this embodiment belongs to the well-known technique and, therefore, only an outline of the means will be described with reference to FIG. 2 below.

In FIG. 2, five distance fields of measuring view, 142a, 142b . . . , 142e are located in a region 141, corresponding to a photographed frame, near the estimated focal plane of the photographing system 1 and well-known focus detection partial systems are provided in one-to-one relation to those five field of view. The focusing beam which has passed through a rectangular field mask of the distance measuring view field 142a at the leftmost end in FIG. 2, for example, is deflected by a leftmost lens of a composite field lens 143 integrally formed, to enter a pair of secondary focusing lenses $144a_1$, $144a_2$.

A diaphragm (not shown) is placed in front of the pair of secondary focusing lenses $144a_1$, $144a_2$. The beam having passed through the secondary focusing lens $144a_1$ focuses an optical image of the view field 142a again on a photoelectric transducer array $145a_1$. On the other hand, the beam having passed through the secondary focusing lens $144a_2$ focuses an optical image of the view field 142a again on photoelectric transducer array $145a_2$. Since a mask opening near the secondary focusing lenses is focused by the field lens substantially at an exit pupil of the photographing lens, the foregoing optical system constitutes the so-called pupil-split focus detection partial system. These five partial systems are arranged side by side and system components are formed into the unitized structure.

The concept of such a focus detection system is well known and this embodiment shown in FIG. 2 includes a system comprising a plurality of partial systems arranged side by side. A manner of calculation and determining a defocus amount of the photographing lens 1 from output signals of photoelectric transfer arrays can also be realized using the well-known technique.

In general, the signals from the photoelectric transducer arrays are serially outputted and applied to an A/D conversion port of a microcomputer built in the camera. The microcomputer sequentially A/D-converts the serial signal at proper timing and stores the converted data in a memory. After completely reading the serial signals, a similarity between light intensity distribution patterns of two images formed by the pair of secondary focusing lenses is derived through correlation calculation to detect a defocus amount of the photographing lens 1.

In this embodiment, the focus detection means and the visual axis detection means may be controlled by the same common microcomputer or by different devices working in cooperation with each other. This embodiment is directed to a mutually related method between focus detection calculation and visual axis detection calculation, and therefore, is premised on such a device being able to control the entire system under a unified process flow.

Figure 3:
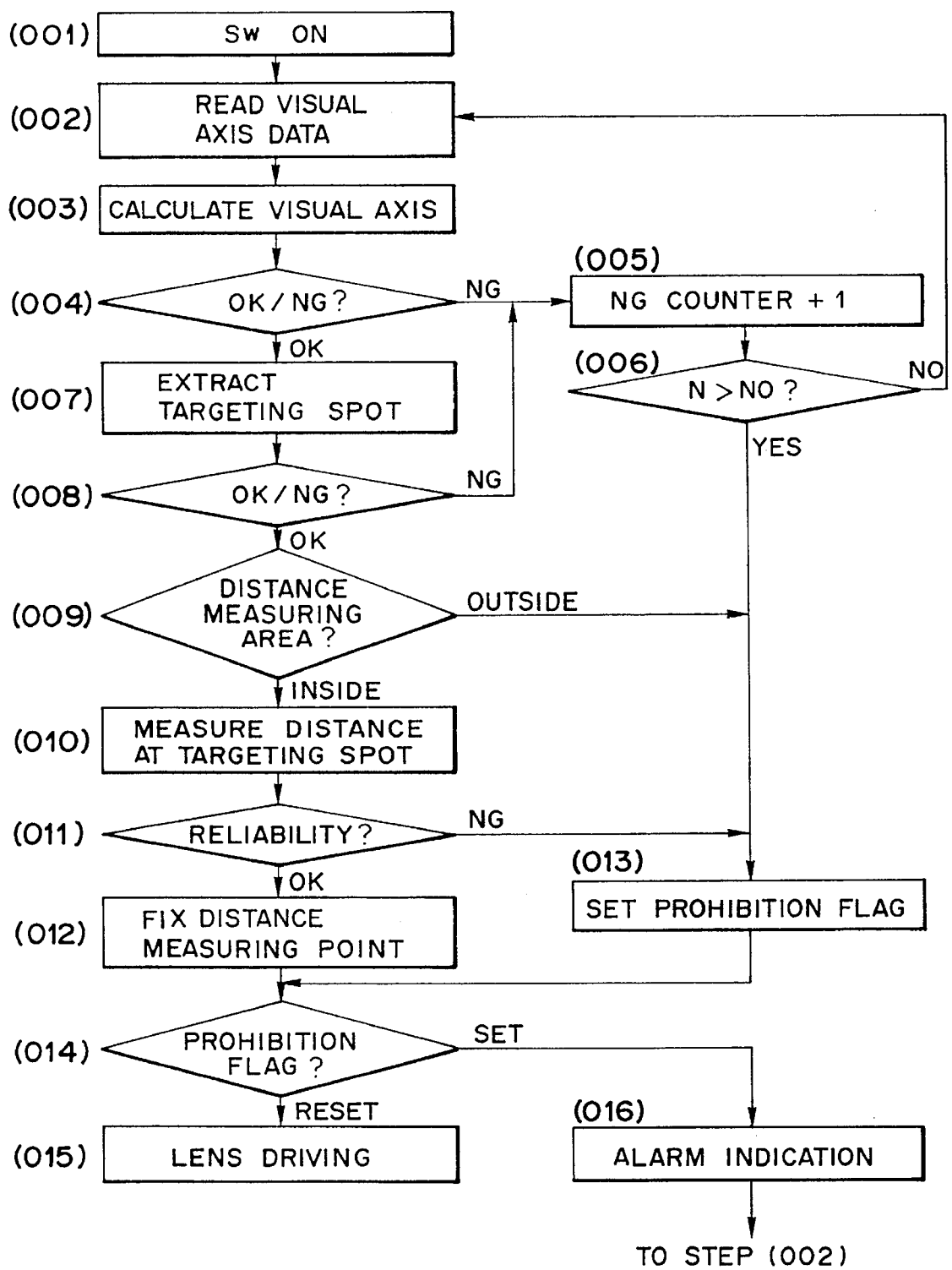
FIG. 3 is a flowchart for the first embodiment.

Operation of the first embodiment shown in FIG. 1 will be next described with reference to a flowchart of FIG. 3.

First, when a routine (001) for detecting a switch (SW) state detects the half or fully depressed state of a shelter release button, the control flow goes to Step (002) and subsequent Steps for detecting the direction of visual axis of a photographer. Since a photographer usually tends to look at the background or surrounding objects as well the main object to be photographed, it is required to follow a motion of the visual axis moment by moment for a predetermined period of time for statistically interpolating the intention of the photographer.

Steps (002) to (004) represent a process for detecting the direction of visual axis once. In Step (007), the targeting spot (targeting direction) intended by the photographer is extracted through predetermined calculation based on the detected direction the of visual axis. It is then determined by judging means in Step (008) whether or not the extracted result has reliability enough for use in control of the camera.

If the results of the calculation of the visual axis (Step (003)) and the extraction of the targeting spot (Step (007)) are not satisfactory (i.e., NG), then the control flow returns to Step (002) for accumulating the visual axis data again. On this occasion, the number of NG times detected is counted in Step (005). If Step (006) determines that NG detection has been repeated over a predetermined number of NO, then the detection of the targeting spot is judged as unable to be effected. The simplest method of extracting the targeting spot is as follows.

Figure 4A:
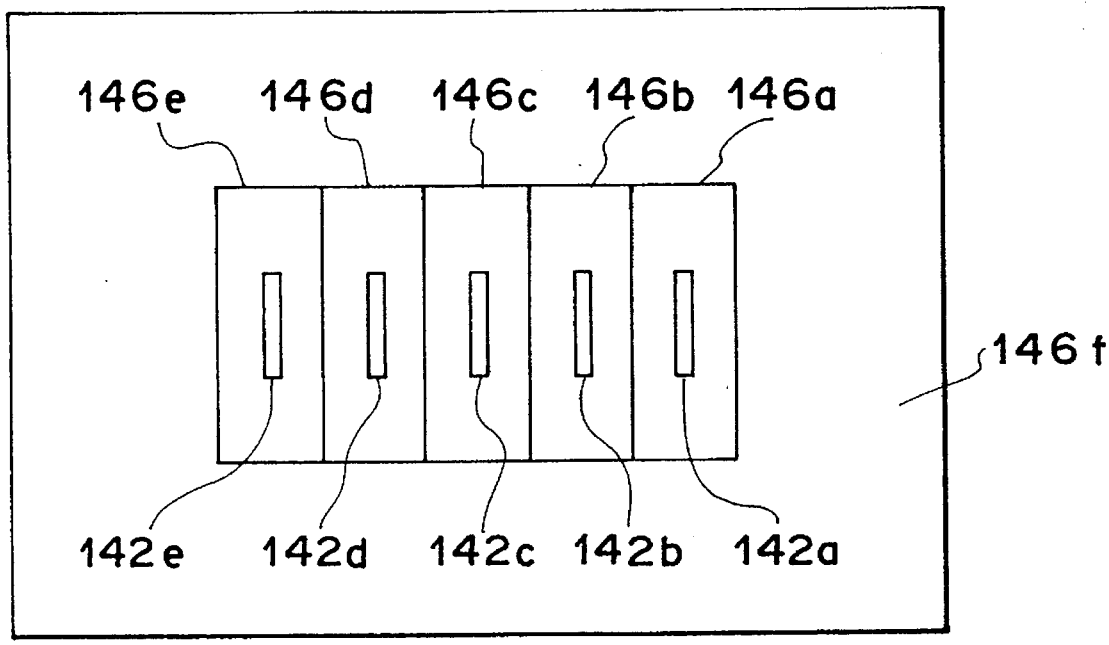
FIGS. 4A and 4B are views for explaining a frame photographed by the camera of the present invention.

A frame region corresponding to the viewfinder is divided into a finite number of small areas, and a distance measuring view field is arranged at the center of each small area. As shown in FIG. 4A, for example, five small areas 146a to 146e respectively containing the distance measuring view fields 142a to 142e at their centers and a small area 146f containing no distance measuring view fields are defined. As a result of repeating the detection of the visual axis N times, if the detected data are concentrated in a particular one of the six small areas (146a to 146e) over a predetermined percentage and the number N is over a predetermined value, the particular area is regarded as an area (targeting spot) where the main object is present, and the distance measuring view field centered in the particular area is extracted. If the particular area is located at the periphery of the small area 146f, the main object is judged to be outside the distance measuring view fields.

Figure 4B:
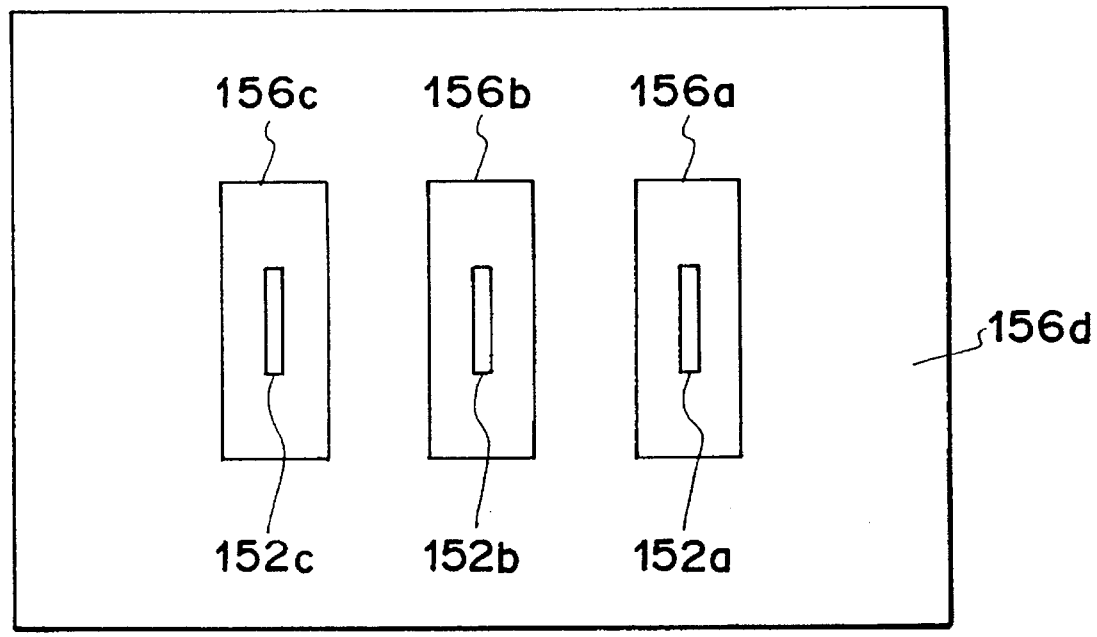

Generally, the visual axis of the photographer's eye is moved discontinuously from one point to another remote point rather than continuously moving in a smooth manner. Accordingly, by measuring a period of time in which the direction of the visual axis is stopped at a certain point as an additional parameter for judgment, the intention of the photographer can be detected with higher reliability.

Where the distance measuring view fields are apart from one another as shown in FIG. 4B, the small areas are also preferably set to be separated in some cases. In Step (010) of a distance measuring sequence, the distance to the object is measured at the targeting spot extracted. A method of determining (in Step (011)) whether or not the distance measured data has accuracy enough for use in focus adjusting control of the camera is well-known. In the case of passive type focus detection, the contrast of an optical image, or the sum of squares of differences between outputs of adjacent pixels, or a comparison of shapes or similarity between two optical images, or a combination thereof, for example, is often used as a judging reference.

In the case of active type focus detection, the magnitude of a reflected light signal is often used. Anyway, the distance to the object in the targeting direction of the photographer is measured and the reliability of the distance measured data is judged based on some reference for determining reliability of the distance measured result. If the distance measured result is judged to be usable, then the control flow goes to Step (012) for fixing both the distance measuring point selected in the above and the measured distance information.

Looking at the state of a lens driving prohibition flag later described, if the prohibition flag is reset, then the control flow goes to Step (015) where the adjusting means drives the focusing portion of the photographing lens.

On the other hand, if it is determined in Step (011) that the result from selecting the distance measuring point based on the targeting spot information and making the distance measurement has accuracy (reliability) not high enough for control of the camera, or if it is determined in Step (006) that the detection of the visual axis cannot be effected, or if it is determined in Step (009) that the targeting spot is outside the distance measurement area, then the lens driving prohibition flag is set in Step (013). If the set state of the prohibition flag is detected in Step (014), then an alarm indication is performed rather than the lens driving the lens to reach the in-focus state.

The alarm indication can be performed by, for example, actuating a buzzer as sound producing means, or lighting up an in-focus indicator lamp as light emitting means while blinking it at a particular cycle or changing colors, or illuminating an alarm lamp. One sequence is programmed such that upon reaching Step (016), the release button is locked in this state and cannot be escaped therefrom unless there occurs any change by monitoring the release switch state.

Alternatively, after issuing the alarm indication in Step (016), the control flow may go to reset the NG counter and return to Step (002), followed by repeating the sequence. In this case, the program can be arranged such that if the control flow can go to Step (012) and fix the distance measuring point and the measured distance information at that point in the repeated sequence even after the prohibition flag has been once set for some reason, the prohibition flag is now reset in Step (012), allowing the control flow to reach the lens driving step.

In this embodiment, the operation of detecting the visual axis and extracting the targeting spot and the operation of detecting the focus may be carried out continuously or discontinuously because those operations are not required to be fixed in timed relation. Depending on cases, it is desirable that those operations are carried out in parallel from the point of reducing the time required for control of the camera.

Figure 5:
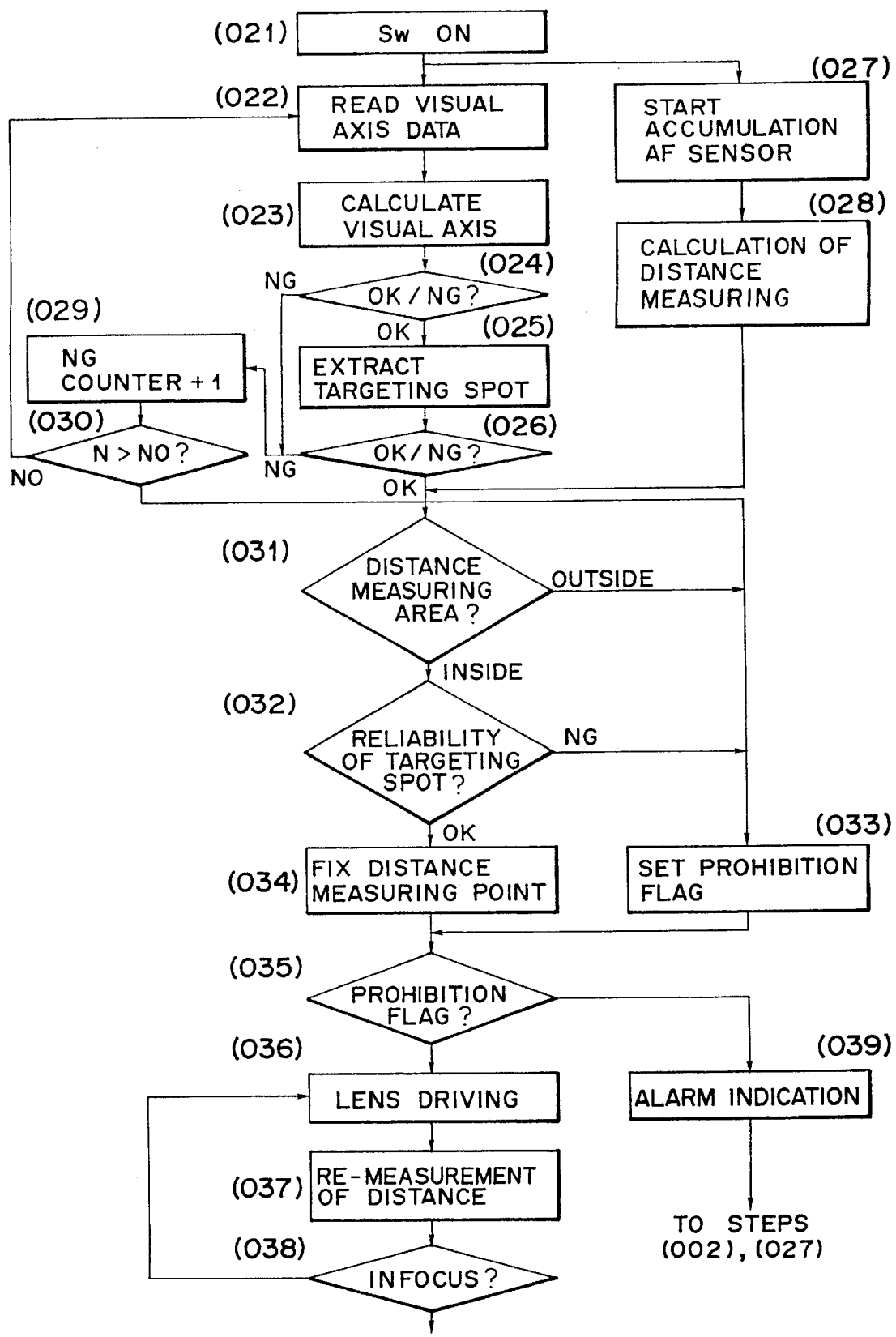
FIG. 5 is a flowchart for a second embodiment.

FIG. 5 is a flowchart of a second embodiment of the present invention for implementing such a parallel scheme. Operation of the second embodiment will be described below. When a routine (021) for detecting a switch (SW) state detects the half or fully depressed state of a release button, the control flow goes to Steps (022) and (023) for detecting the direction of the visual axis of a photographer.

In Step (025), the targeting spot (targeting direction) intended by the photographer is extracted through predetermined calculation. It is then determined in Step (026) whether or not the extracted result has reliability enough for use in control of the camera. If the decision result is NG, then the control flow returns to Step (022) for accumulating the visual axis data again after incrementing an NG counter (Step (029)) and checking the number of NG times (Step (030)).

While the visual axis detection system is repeating the above operation, the distance measuring system carries out distance measurement for all the view fields in Steps (027) to (028) in parallel. Since sensors for receiving optical images of the view fields are provided in one-to-one relation, photoelectric converting operations of the sensors for all the view fields can be started simultaneously. Subsequent signal processing in the multi-point distance measuring system can be achieved based on the well-known technique by measuring the defocus amount or distance for each distance measuring point.

If the targeting spot extracted in Step (026) is judged to be OK, meaning that the targeting spot is inside the distance measuring area, and also the distance measurement up to Step (028) is completed, then the control flow goes to Step (032) for determining reliability (accuracy) of the distance measured data in the targeting direction. If the decision result is OK, then the distance measuring point is fixed in Step (034). If the decision result is NG, then the control flow goes to Step (033). Step (033) sets a lens driving prohibition flag if there occurs a failure or mismatch in the visual axis detection system and the focus detection system, including such cases as where the detection cannot be effected in the targeting direction (i.e., the direction of visual axis), and the targeting spot is outside the distance measuring area.

Confirming the state of the lens driving prohibition flag in Step (035) after the processing in Steps (033) and (034), if the prohibition flag is reset, then the control flow goes to Step (015) where the adjusting means drives the focusing lens of the photographing lens system toward an in-focus position depending on the information fixed in Step (034). After completion of the lens driving, though the subsequent sequence is not essential, the distance to the object is measured again (037) and the in-focus state is confirmed (038). If the in-focus state is confirmed, then the control flow goes to a next sequence (not shown) for indication, AF locking operation, etc. If the in-focus state is not achieved, then the control flow returns to Step (036) to perform the lens driving for correction. This distance remeasuring sequence can be practiced in the foregoing embodiment as well.

On the other hand, if the prohibition flag is set in Step (035), then the control flow goes to Step (039) where alarm indication, etc. is performed rather than the lens driving. The alarm indication can be effectively performed, as with the above first embodiment, by actuating a buzzer, or lighting up an in-focus indicator lamp while blinking it at a particular cycle or changing colors, or illuminating an alarm lamp. One sequence is programmed such that upon reaching Step (039), the release button is locked in this state and cannot be escaped therefrom unless there occurs any change by monitoring the release switch state.

Alternatively, after issuing the alarm indication in Step (039), the control flow may go to reset the NG counter and return to Step (022), followed by repeating the sequence. In this case, the program can be arranged such that if the control flow can go to Step (034) and fix the distance measuring point and the measured distance information at that point in the repeated sequence even after the prohibition flag has been once set for some reason, the prohibition flag is now reset in Step (034), allowing the control flow to reach the lens driving.

Although the focus detection system using the TTL technique has been explained as the passive type in the above embodiments, the present invention can also provide a similar advantageous effect with an active type multi-point distance measuring system using the non-TTL technique.

Furthermore, in the case of sharing a two-dimensional image pick-up device for the TV screen and light receiving means for the focus detection as with the focus detection technique used in a video camera, the multi-point focus detection system can also be practically constituted by properly dividing the frame (in an overlapped manner depending on cases), and the present invention can be effectively implemented in combination with the visual axis detection system.

Figure 6:
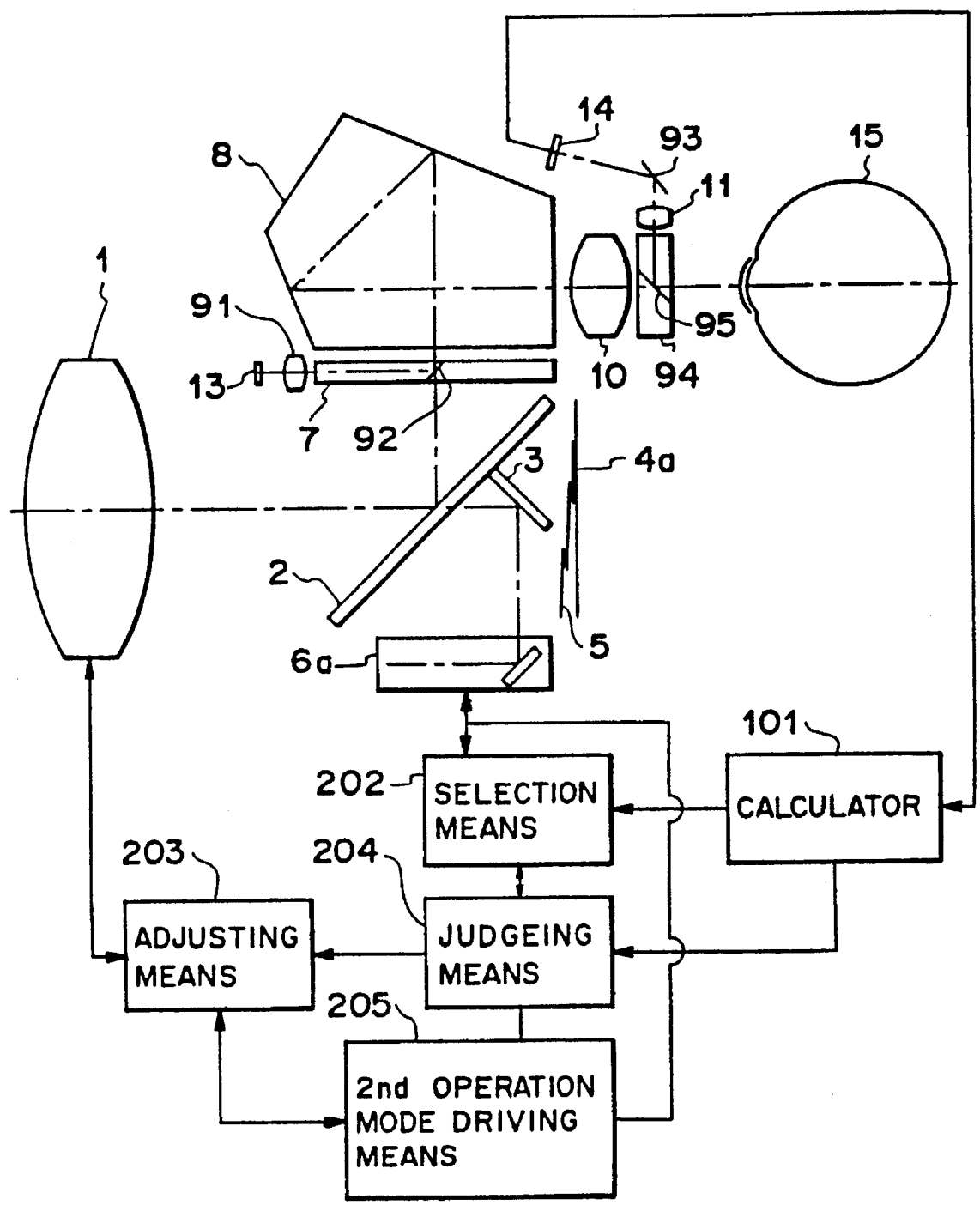
FIG. 6 is an optical sectional view of a third embodiment.

FIG. 6 shows a third embodiment in which the same components as those in FIG. 1 are denoted by the same reference numerals. Those components which have already been explained will not be explained here.

Denoted by 202 is selection means for selecting any one of plural focus detection signals (e.g., infocus signals) sent from the focus detection means 6a and corresponding to a plurality of distance measuring areas, in response to a signal releated to the targeting direction obtained by the calculator 101 as one component of the visual axis detection means.

Denoted by 204 is judging means which determines whether or not the one in-focus signal selected by the selection means 202 is satisfactory, whether or not the signal related to the targeting direction (targeting spot) obtained by the calculator 101 of the visual axis detection means is satisfactory, and whether or not the targeting point obtained by the calculator 101 is included in the area to be measured by the focus detection means. When it is judged that an in-focus attaining operation is to be performed using those obtained signals, i.e., that a first operation mode is to be taken, a signal indicating such judgment is inputted to adjusting means 203. When it is judged that the in-focus attaining operation is to be performed by a preset method in place of using those obtained signals, i.e., that a second operation mode is to be taken, a signal indicating such judgment is inputted to second operation mode driving means 205. In response to the signal from the judging means 204, the second operation mode driving means 205 obtains an in-focus signal in accordance with a preset method and applies the in-focus signal to the adjusting means 203.

In response to the signal from the judging means 204 or the second operation mode driving means 205, the adjusting means 203 drives a focusing lens (not shown) of the photographing system 1 in the first or second operation mode, thereby adjusting the in-focus state.

Figure 7:
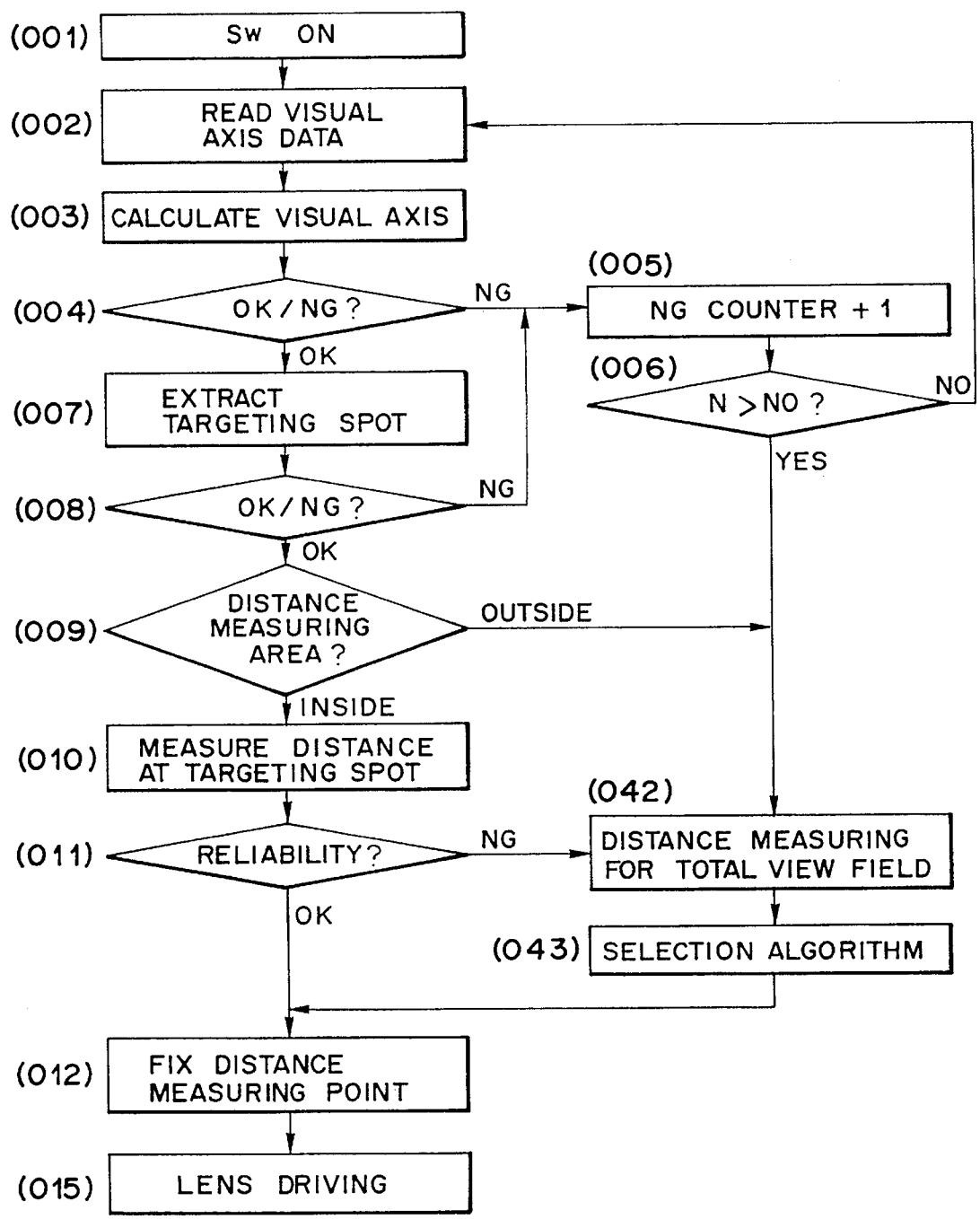
FIG. 7 is a flowchart for the third embodiment.

FIG. 7 shows a flowchart for operation of the third embodiment. The control flow up to step (011) in FIG. 7 is the same as that in FIG. 3 and, therefore, will not be explained here.

If it is determined in Step (011) that the result from selecting the distance measuring point based on the targeting spot information and making the distance measurement has accuracy (reliability) not enough for control of the camera, or if it is determined in Step (006) that the detection of the visual axis cannot be effected, or if it is determined in Step (009) that the targeting spot is outside the distance measurement area, then the control flow goes to step (042) for measuring the distance to the object for all the distance measuring view fields 142a to 142e.

On this occasion, the distance measurement may be omitted for that distance measuring view field in the targeting direction which has already been subjected to the measurement. After completion of the distance measurement for all the distance measuring view fields 142a to 142e, the control flow goes to step (043) where a particular one or plural distance measuring view fields are selected as a target of focus control in accordance with a distance measuring point automatic selection algorithm.

With the above sequence, stable control can be achieved regardless of whether or not the distance measurement can be effected for one point in the targeting direction. Even if the direction of the visual axis cannot be detected, the control is achieved without causing large errors.

Regarding a selection method, although there are known several algorithms, a close-point priority algorithm is effective for its simplicity. With this algorithm, Step (043) identifies the position and measured distance information for the view field looking at the nearest object to the camera among those distance measuring view fields for which the distance measurement can be effected in Step (042). After Step (043), the control flows returns to the same sequence as mentioned above.

The number of particular distance measuring view fields to be selected is not always limited to one, and a plurality of view fields may be selected. When the distance measurement cannot be effected in the targeting direction, accuracy is inevitably lowered in spite of how the correct focus is estimated from the other measured distance information using the automatic selection algorithm, and perfectly predicting the intention of the photographer is difficult without the visual axis information. Therefore, it can be practiced as one method to select a plurality of distance measuring view fields and adjust the diaphragm of the photographing system so that those view fields come into the depth of a focus.

In this case, it is desirable that the distance measuring view field which is within a predetermined defocus range from the object near the camera is practically brought into the in-focus state. The predetermined defocus range can be more desirably changed depending on a light intensity level of the object based on the information of automatic exposure control (AE).

In this embodiment, the operation of detecting the visual axis and extracting the targeting spot and the operation of detecting the focus may be carried out continuously or discontinuously because those operations are not required to be fixed in timed relation. Depending on cases, it is desirable that those operations are carried out in parallel from the point of reducing the time required for control of the camera.

Figure 8:
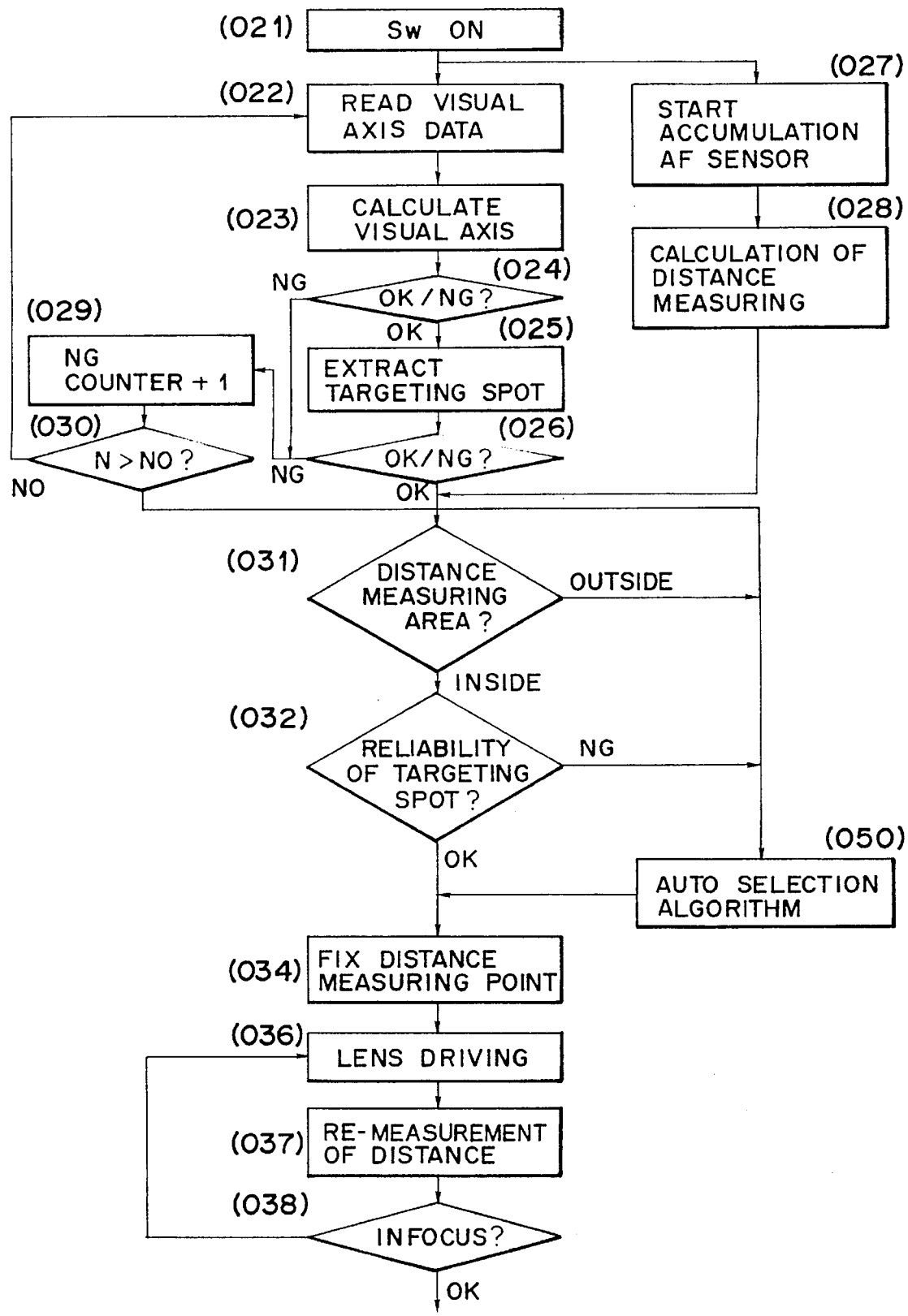
FIG. 8 is a flowchart for a fourth embodiment.

FIG. 8 is a flowchart of a fourth embodiment of the present invention for implementing such a parallel scheme. Since this flowchart is almost the same as that of FIG. 5, there will be explained here only differences between the two flowcharts.

If the targeting spot extracted in Step (026) is judged to be OK, meaning that the targeting spot is inside the distance measuring area, and also the distance measurement up to Step (028) is completed, then the control flow goes to Step (032) for determining reliability (accuracy) of the distance measured data in the targeting direction. If the decision result is NG, then the control flow goes to Step (050) for selecting the distance measuring point using the selection algorithm.

Based on the result of Step (032) or Step (053), the selected distance measuring point and the measured distance information are fixed in Step (034), following which the focusing lens is driven toward an in-focus position of the photographing lens system. It is desirable that after completion of the lens driving, the distance to the object is measured again (037) and the in-focus state is determined (038) and, if the decision result is NG, then the focusing lens is driven again based on the preceding remeasured data. This distance remeasuring sequence can be practiced in the foregoing embodiment as well.

Figure 9:
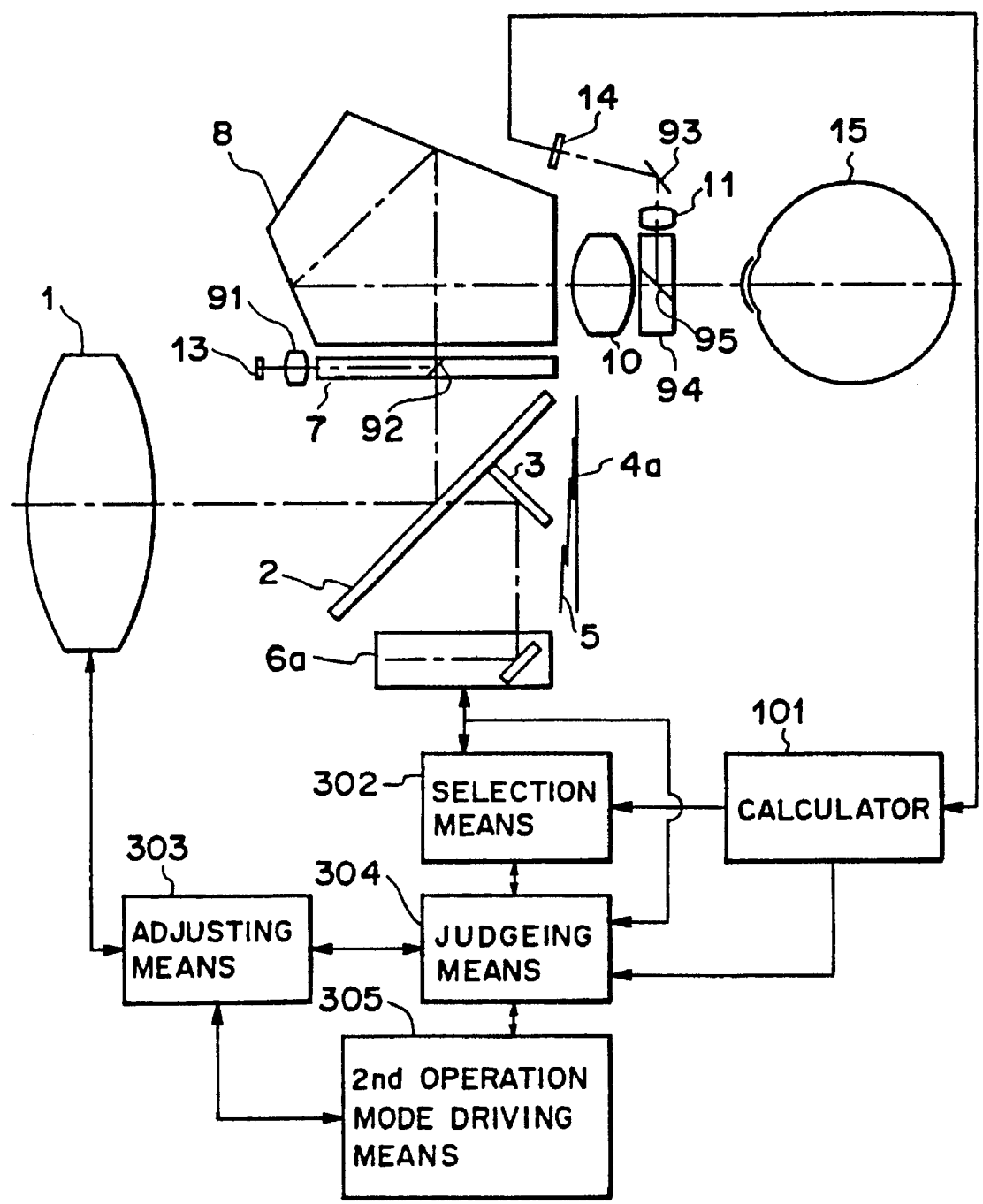
FIG. 9 is an optical sectional view of a fifth embodiment.

FIG. 9 shows a fifth embodiment in which the same components as those in FIG. 1 are denoted by the same reference numerals.

Denoted by 302 is selection means for selecting any one of plural focus detection signals (e.g., in-focus signals) sent from the focus detection means 6a and corresponding to a plurality of distance measuring areas, in response to a signal related to the targeting direction obtained by the calculator 101 as one component of the visual axis detection means.

Denoted by 304 is judging means which determines whether or not the one in-focus signal selected by the selection means 302 is satisfactory. Then, when it is judged that an in-focus attaining operation is to be performed using the obtained signal, i.e., that a first operation mode is to be taken, a signal indicating such judgment is inputted to adjusting means 303. When it is judged that use of the obtained signal is not appropriate, i.e., that a second operation mode is to be taken, a signal indicating such judgment is inputted to second operation mode driving means 305.

In addition, the judging means 304 also detects that the targeting direction obtained by the calculator 101 is present in which one of the plural detection areas within the viewfinder is to be measured by the focus detection means 6e. When the targeting direction is judged to be not present in any area, a signal indicating such judgment is inputted to the second operation mode driving means 305 so that the second operation mode is taken.

In response to the signal from the judging means 304 or the second operation mode driving means 305, the adjusting means 303 drives a focusing lens (not shown) of the photographing system 1 in the first or second operation mode, thereby adjusting the in-focus state.

Figure 10:
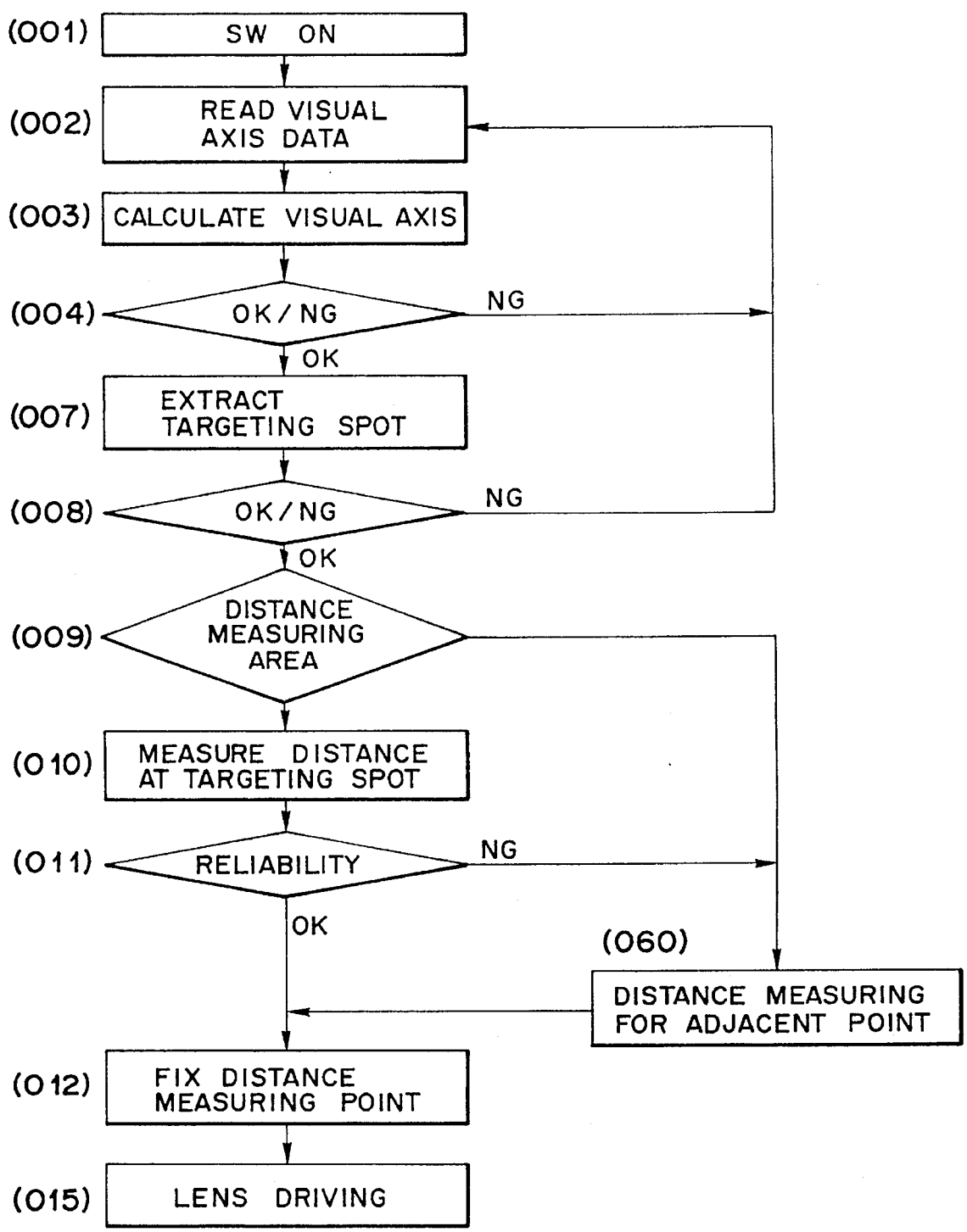
FIG. 10 is a flowchart for the fifth embodiment.

FIG. 10 shows a flowchart for operation of the fifth embodiment. Many of steps in FIG. 10 are the same as those in FIG. 7 and, therefore, will not be explained here.

If the result of calculating the visual axis (Step (003)) or extracting the targeting spot (Step (005)) is not satisfactory, the control flow returns to Step (002) for accumulating the visual axis data again.

In Step (010) of a distance measuring sequence, the distance to the object is measured at the targeting spot extracted. A method of determining in Step (011) whether or not the distance measured data has accuracy enough for use in focus adjusting control of the camera is well known. In the case of passive type focus detection, contrast of an optical image, or the sum of squares of differences between outputs of adjacent pixels, or comparison of shapes or similarly between two optical images, or a combination thereof, for example, is often used as a judging reference.

In the case of active type focus detection, the magnitude of a reflected light signal is often used. Anyway, the distance to the object in the targeting direction of the photographer is measured and the reliability of the distance measured data is judged based on some reference suited for determining reliability of the distance measured result. If the distance measured result is judged to be usable, then the control flow goes to Step (012) for fixing both the distance measuring point selected in the above process and the measured distance information. After that, the control flow goes to Step (015) for driving the focusing portion of the photographing lens by the adjusting means.

On the other hand, if Step (011) determines that the result of selecting the distance measuring point and measuring the distance to the object based on the targeting spot information in Step (010) has accuracy (reliability) not enough for use in control of the camera, the control flow goes to Step (060) for measuring the distance to the object in the other preset area.

In this embodiment, the distance measurement is performed at the distance measuring point in the adjacent area. This process will now be explained.

Let it be assumed that the small area 146d in FIG. 4A, for example, is determined as the area of the targeting spot. When the result measured in the distance measuring view field 142d cannot be used for control, however, the distance measurement is performed at the adjacent distance measuring point on the nearer side depending on whether the targeting spot is located in the right or left portion of the small area 146d. Specifically, the distance measuring view field 142c is selected if the targeting spot is located in the right portion of the small area 146d, and the distance measuring view field 142e is selected if it is located in the left portion thereof, followed by the distance measurement. The position of the targeting point in the area 146d can be found by, for example, calculating an average value of all the visual axis detection points measured in the small area 146d. Alternatively, the distance measurement may be carried out for the two adjacent view fields 142c, 142e on both sides, followed by selecting one of the measured results which indicates the object nearer to the camera.

This embodiment is premised on an estimation that if the main object to be photographed has a substantial size, it will spread over two or more adjacent distance measuring view fields. It is therefore desirable in practice for the multi-point distance measuring view fields to be arrayed densely. If the spacing between the adjacent two distance measuring view fields is too large, the background would be often picked up and subjected to automatic focus detection, thereby causing the system to malfunction.

Figure 11:
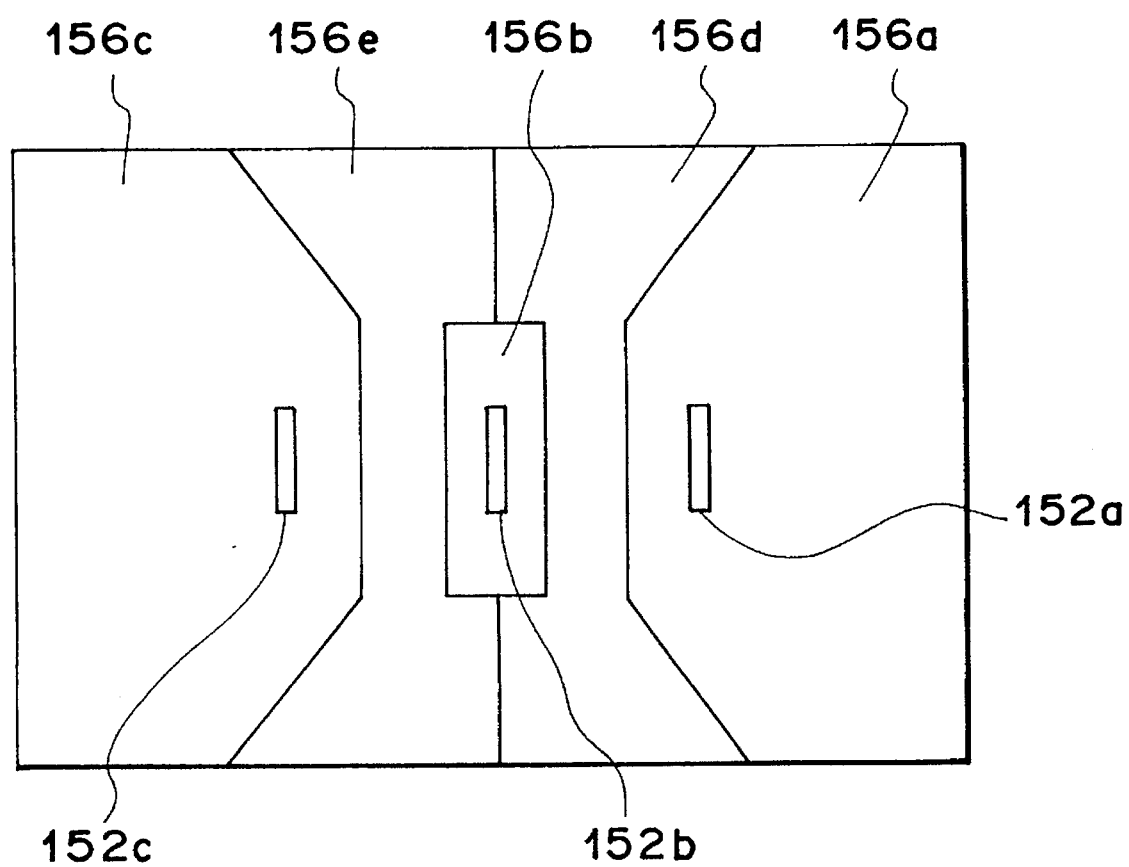
FIG. 11 is a view showing one example of arrangement of distance measuring areas.

When the adjacent distance measuring view fields are apart from one another, malfunctions can be reduced in the practice of photographing by setting the plurality of visual axis detection areas like patterns as shown in FIG. 11.

More specifically, in FIG. 11, areas 156a to 156c are defined respectively corresponding to distance measuring points 152a to 152c, whereas areas 156d, 156e are defined as intermediate areas. When the targeting spot is detected as being in any of the areas 156a to 156c, the distance measurement is performed at the corresponding distance measuring point. However, when the targeting spot is detected as being in the area 156d or 156e, there is no corresponding distance measuring point. In this case, as one practical process, the distance measurement is performed for the two distance measuring view fields on both sides, and the object nearer to the camera is selected. The above detection for the targeting point corresponds to the decision of Step (009) in the flowchart of FIG. 10. In the case of the areas 156d, 156e being detected, the control flow goes to Step (060) via a branch from Step (009).

Figure 12:
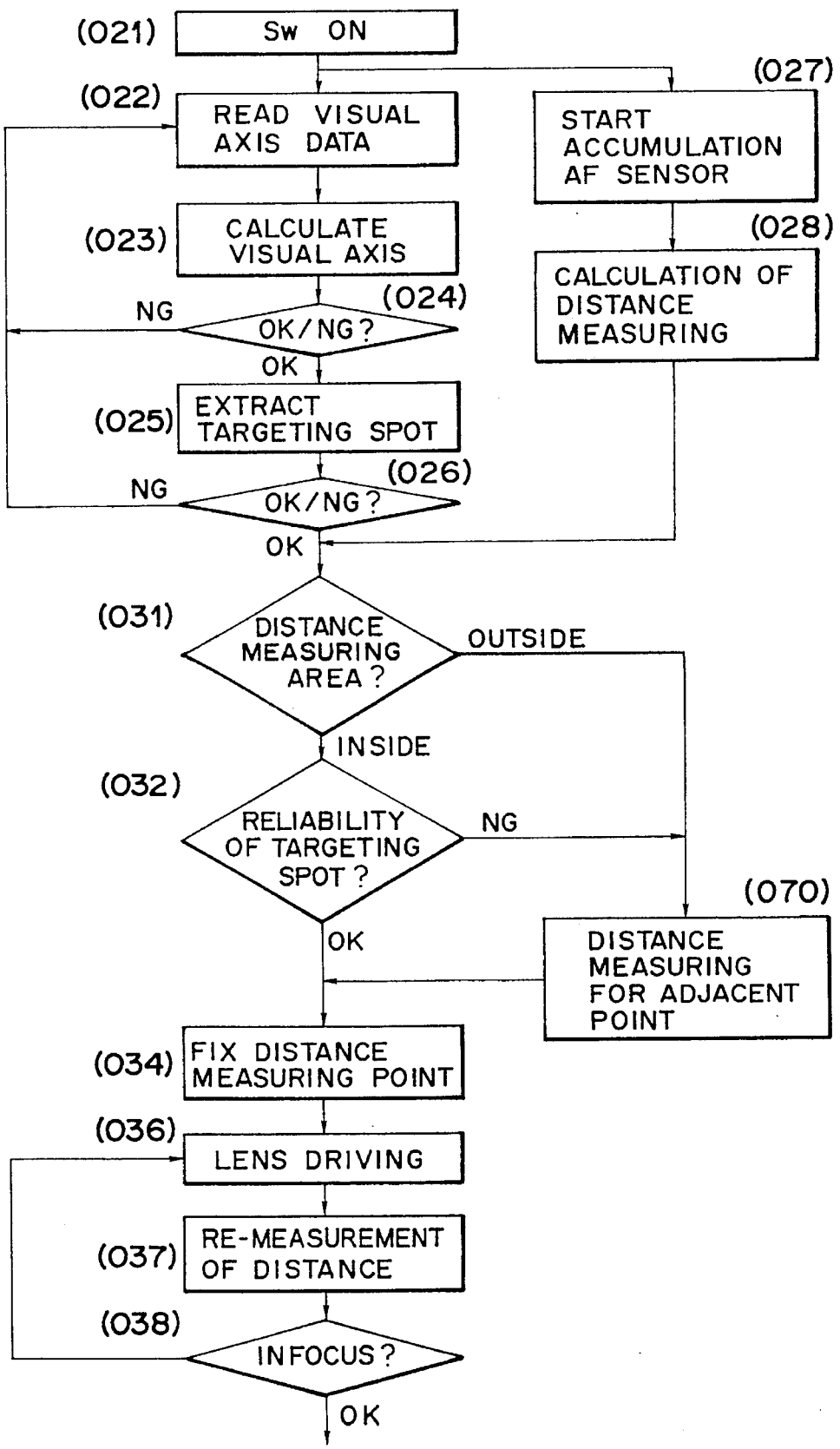
FIG. 12 is a flowchart for a sixth embodiment.

Next, FIG. 12 is a flowchart of a sixth embodiment of the present invention for implementing the fifth embodiment in a parallel scheme. Steps in FIG. 12 which overlap with those in FIG. 8 will not be explained here.

In Step (025), the targeting spot (targeting direction) intended by the photographer is extracted through predetermined calculation. It is then determined in Step (026) whether or not the extracted result has reliability enough for use in control of the camera. If the decision result is NG, then the control flow returns to Step (022) for accumulating the visual axis data again.

If the targeting spot extracted in Step (026) is judged to be OK, meaning that the targeting spot is inside the distance measuring area, and also the distance measurement up to Step (028) is completed, then the control flow goes to Step (032) for determining reliability (accuracy) of the distance measured data in the targeting direction.

If the decision result of OK, then the control flow goes to Step (034) for fixing both the distance measuring point and the distance measured data. On the other hand, if the decision result is NG, then the control flow goes to Step (070) for actuating a selection algorithm of the adjacent distance measuring point. Since Step (028) has been completed and all the distance measured data are already present, Step (070) simply selects the corresponding data.

The method of selecting the corresponding data can be practiced by determining, through calculation, whether the targeting spot is deviated in the visual axis detection area to the right or left half-portion thereof, and then selecting one of the adjacent two view fields, or selecting one of the adjacent two view fields which contains the object nearer to the camera. After Step (070), the control flow goes back to Step (034) for fixing the measured distance information. In Step (036), the adjusting means drives the focusing lens toward an infocus position. After completion of the lens driving, the distance to the object is measured again (037) and the in-focus state is determined (038). If the decision result is NG, then the focusing lens is driven again based on the preceding remeasured data.

Note that the above distance remeasuring sequence can be similarly applied to the fifth embodiment as well.

According to the present invention, as fully described above, when attaining the in-focus state of the photographing system by the use of a signal from visual axis detection means and a signal from focus detection means, if distance measurement (focus detection) for the distance measuring view field in the targeting direction cannot be effected, or if no distance measuring view field exists in the targeting direction, by way of example, that fact is provided to a photographer, or an automatic selection algorithm is actuated to obtain the distance measured information for another distance measuring view field. As a result, there can be achieved a camera with the visual axis detection means and the focus detection means which can satisfactorily perform the operation for attaining the in-focus state, prevent malfunction in the practice of photographing, and fulfill various photographing functions in a satisfactory manner.

What is claimed is:

1. A camera having an optical system, comprising:

observing means for observing an object;

means for detecting a direction of a visual axis of an observer looking into said observing means;

means for detecting a focus condition of each of a plurality of different positions in a field of view, and for outputting a plurality of focus signals respectively corresponding to the plurality of detected focus conditions;

means for obtaining a focus result from a focus signal which corresponds to the position in the field of view looked at by the observer as detected by said means for detecting the direction of the visual axis;

means for preparing a focus adjustment signal based on the focus result obtained by said means for obtaining; and prohibition means for preparing a prohibit signal to prohibit a focus adjustment operation of the optical system, said prohibit signal being based on an output from said means for detecting the direction of the visual axis, said prohibition means preparing the prohibit signal when said means for detecting the direction of the visual axis cannot detect the visual axis direction or detects a visual axis with low reliability or detects that said visual axis direction is not directed to said plurality of different positions.

2. A camera having an optical system, comprising:

observing means for observing an object;

means for detecting a direction of a visual axis of an observer looking into said observing means;

means for detecting a focus condition of each of a plurality of different positions in a field of view, and for outputting a plurality of focus signals respectively corresponding to the plurality of detected focus conditions;

means for obtaining a focus result from a focus signal which corresponds to the position in the field of view looked at by the observer as detected by said means for detecting the direction of the visual axis;

means for preparing a focus adjustment signal based on the focus result obtained by said means for obtaining;

prohibition means for preparing a prohibit signal to prohibit a focus adjustment operation of the optical system, said prohibit signal being based on an output from said means for detecting the direction of the visual axis; and at least one of (i) means for issuing a visual alarm, and (ii) means for issuing an acoustic alarm, said alarms being activated by said prohibit signal prepared by said prohibition means.

3. A camera comprising:

observing means for observing an object;

means for detecting a direction of a visual axis of an observer looking into said observing means, and for outputting a corresponding visual axis signal;

means for detecting a focus condition of each of a plurality of positions in an observation field of view, and for outputting a plurality of focus signals respectively corresponding to the plurality of detected focus conditions;

means for obtaining a focus result from a focus signal which corresponds to the position in the observation field of view which corresponds to the visual axis signal detected by said means for detecting the direction of the visual axis; and control means having a first mode in which a focus adjustment signal is prepared based on said obtained focus result, and a second mode in which a focus adjustment signal is prepared based on one of the focus signals provided by said means for detecting a focus condition irrespective of the output visual axis signal, wherein said control means selects one of the first and second operation modes based on an output from said means for detecting a direction of a visual axis or said means for obtaining a focus result.

4. A camera according to claim 3, wherein said control means actuates said second operation mode when said focus result obtained by said means for obtaining is unusable.

5. A camera according to claim 3, wherein said control means actuates said second operation mode when the focus result cannot be obtained by said means for obtaining, or when a reliability of said focus result is low.

6. A camera according to claim 3, wherein said control means actuates said second operation mode when the visual axis signal output by said means for detecting the direction of the visual axis does not correspond to any of a plurality of predetermined detection areas in an observation field of view.

7. A camera comprising:

observing means for observing an object;

means for detecting a direction of a visual axis of an observer looking into said observing means, and for outputting a corresponding visual axis signal;

means for detecting a focus condition of each of a plurality of positions in an observation field of view, and for outputting a plurality of focus signals respectively corresponding to the plurality of detected focus conditions;

means for obtaining a focus result from a focus signal which corresponds to the position in the field of view looked at by the observer as detected by said means for detecting the direction of the visual axis; and control means having a first mode in which a focus adjustment signal is prepared based on said obtained focus result, and a second mode in which a focus adjustment signal is prepared based on a focus signal for a position in a predetermined relationship with respect to a position corresponding to the visual axis signal, wherein said control means selects one of the first and second operation modes based on an output from said means for detecting a direction of a visual axis or said means for obtaining a focus result.

8. A camera according to claim 7, wherein said predetermined relationship specifies a focus signal position adjacent a visual axis signal position.

9. A camera according to claim 7, wherein said control means actuates said second operation mode when said focus result obtained by said means for obtaining is unusable.

10. A camera according to claim 7, wherein said control means actuates said second operation mode when the visual axis signal output by said means for detecting the direction of the visual axis does not correspond to any of a plurality of predetermined detection areas in an observation field of view.

11. A camera according to claim 3, wherein said means for detecting a focus condition comprises a passive type focus detection system.

12. A camera according to claim 7, wherein said means for detecting a focus condition comprises a passive type focus detection system.

13. A camera according to claim 3, wherein said means for detecting a focus condition comprises an active type focus detecting system.

14. A camera according to claim 7, wherein said means for detecting a focus condition comprises an active type focus detecting system.

15. An apparatus comprising:

detecting means for detecting a visual axis direction of an observer; and control means for evaluating an output of said detecting means and for activating an alarm according to a result of the evaluation.

16. An apparatus according to claim 15, wherein said control means activates the alarm when said control means determines that the output of said detecting means is not satisfactory.

17. An apparatus according to claim 16, wherein said control means activates a display alarm.

18. An apparatus according to claim 16, wherein said control means activates a sound alarm.

19. An apparatus according to claim 16, wherein said control means performs a focusing operation for an objective lens of said apparatus according to the output of said detecting means.

20. Apparatus according to claim 15, wherein said control means activates the alarm according to said output when said control means determines that the reliability of the output of said detecting means is low.

21. Apparatus according to claim 15, wherein said control means determines whether said visual axis direction has been detected or not and outputs the alarm in a case where it has not been detected.

22. Apparatus according to claim 15, wherein a measuring area is provided in a view field, and wherein said control means determines whether a point corresponding to the visual axis direction lies in the measuring area or not and outputs the alarm in a case where it does not lie therein.

23. Apparatus according to claim 22, wherein the measuring area comprises an area where measurement of focusing is performed.

24. Apparatus according to claim 22, wherein the measuring area comprises an area where measurement of distance is performed.

25. An apparatus comprising:
    detecting means for detecting which portion of a view field is gazed at by an observer;
    control means for evaluating an output of said detecting means, and for activating an alarm according to a result of the evaluation.

26. An apparatus according to claim 25, wherein said control means activates the alarm according to said output when said control means determines that the reliability of the output of said detecting means is low.

27. An apparatus according to claim 26, wherein said control means activates a sound alarm.

28. An apparatus according to claim 25, wherein said control means performs a focusing operation for an objective lens of said apparatus according to said output.

29. An apparatus according to claim 16, wherein said control means activates a display alarm.

30. Apparatus according to claim 25, wherein said control means activates the alarm when said control means determines that the output of said detecting means is not satisfactory.

31. Apparatus according to claim 25, wherein said control means determines whether the visual axis direction has been detected or not and outputs the alarm in a case where it is has not been detected.

32. Apparatus according to claim 25, wherein a measuring area is provided in a view field, and wherein said control means determines whether the gazed portion lies in the measuring area or not and outputs the alarm in a case where it does not lie therein.

33. Apparatus according to claim 32, wherein the measuring area comprises an area where measurement of focusing is performed.

34. Apparatus according to claim 32, wherein the measuring area comprises an area where measurement of distance is performed.

35. An optical apparatus comprising:
    measuring means for performing a distance measurement for each of a plurality of portions of a view field;
    selecting means for selecting any of said plurality of portions based on visual axis information; and
    control means for controlling said optical apparatus based on an output of said measuring means;
    said control means evaluating said visual axis information and, based on the evaluation result, controlling said apparatus in accordance with (i) a measurement result on a portion of said view field which corresponds to said visual axis information, or (ii) a measurement result on a portion automatically selected from among said plurality of portions of said view field.

36. An apparatus according to claim 35, wherein said selecting means includes means for detecting a visual axis direction of an observer of said apparatus.

37. An apparatus according to claim 36, wherein said control means controls said apparatus with an automatically selected measured result when said control means determines that an output of said detecting means is not satisfactory.

38. An apparatus according to claim 35, wherein said measuring means measures a defocus amount for each of said plurality of portions, and wherein said control means performs a focusing operation for an objective lens according to the measurement result.

39. An apparatus according to claim 35, wherein said control means selects a portion of said view field nearest to said apparatus from among said plurality of portions when a portion is automatically selected.

40. An apparatus according to claim 30, wherein said selecting means includes means for detecting which one of said plurality of portions is gazed at by an observer of said apparatus, said selecting means selecting one of said plurality of portions based on the detected gaze.

41. An apparatus according to claim 35, wherein said control means controls said optical apparatus with an automatically selected measured result when said control means determines that a reliability of an output of said detecting means is low.

42. An apparatus according to claim 35, wherein said control means controls said optical apparatus with an automatically measured result when said control means determines that said detecting means has detected a portion other than said plurality of portions.

43. An apparatus according to claim 35, wherein said optical apparatus comprises a camera.

44. An apparatus according to claim 35, wherein said measuring means performs the measurement before said selecting means performs its selection.

45. An apparatus according to claim 35, wherein said measuring means performs its distance measurement simultaneously with said selecting means performing its selection.

46. Apparatus according to claim 36, wherein said control means controls said apparatus based on an auto-selected measurement result when said control means determines that a point corresponding to the visual axis direction does not lie in the measuring area.

47. Apparatus according to claim 36, wherein said control means controls said apparatus based on an auto-selecting measurement result when said control means determines that the visual axis direction has not been detected.

48. Apparatus according to claim 36, wherein said control means controls said apparatus based on an auto-selected measurement result when said control means determines that the reliability of an output of said detecting means is low.

49. Apparatus according to claim 40, wherein said control means controls said apparatus based on an auto-selected measurement result when said control means determines that the output of said detecting means does not exist.

50. Apparatus according to claim 36, wherein when the measurement result of portions of corresponding to outputs of said selecting means in the view field is not satisfactory, said control means automatically selects a portion from among the plurality of portions in the view field and controls said apparatus based on the measurement results of the selected portions.

51. Apparatus according to claim 40, wherein when the measurement result of portions of corresponding to outputs of said selecting means in the view field is not satisfactory, said control means automatically selects a portion from among the plurality of portions in the view field and controls said apparatus based on the measurement results of the selected portions.

52. An optical apparatus comprising:

measuring means for performing a distance measurement for each of a plurality of portions in a view field;

selecting means for selecting any of said plurality of portions based on visual axis information; and control means for controlling said optical apparatus based on an output of said measuring means;

said control means evaluating an output of said measuring means, and based on the evaluation result, controlling said apparatus in accordance with (i) a measurement result on a portion of said view field which corresponds to said visual axis information, or (ii) a measurement result on a portion automatically selected from among said plurality of portions of said view field.

53. An optical apparatus comprising:

measuring means for performing a distance measurement for each of a plurality of portions of a view field;

means for detecting a visual axis direction of a user of said apparatus; and control means for controlling said optical apparatus based on an output of said measuring means;

said control means evaluating an output of said means for detecting or said measuring means and, based on the evaluation result, controlling said apparatus in accordance with (i) a measurement result on a portion of said view field which corresponds to the visual axis direction, or (ii) a measurement result on a portion automatically selected from among the plurality of portions in said view field.

\* \* \* \* \*

UNITED STATES PATENT AND TRADEMARK OFFICE
CERTIFICATE OF CORRECTION

PATENT NO.  : 5,579,078
DATED       : November 26, 1996
INVENTOR(S) : KENJI SUZUKI It is certified that error appears in the above-indentified patent and that said Letters Patent is hereby corrected as shown below:

Drawings:
SHEET 6

Fig. 6, "JUDGEING" should read --JUDGING--.

SHEET 9

Fig. 9, "JUDGEING" should read --JUDGING--.

COLUMN 2

Line 27, "reduce." should read --reduced.--

COLUMN 3

Line 5, "went that" should read --case wherein--.
Line 41, "infocus" should read --in-focus--.

COLUMN 6

Line 21, "fields of measuring" should read --measuring fields of--.
Line 26, "field" should read --fields--.

UNITED STATES PATENT AND TRADEMARK OFFICE
CERTIFICATE OF CORRECTION

PATENT NO. : 5,579,078

DATED : November 26, 1996

INVENTOR(S) : KENJI SUZUKI

It is certified that error appears in the above-indentified patent and that said Letters Patent is hereby corrected as shown below:

COLUMN 7

Line 8, "shelter" should read --shutter--.
Line 21, "the of" should red --of the--.

COLUMN 8

Line 28, "the lens driving" should read --driving the lens--.

COLUMN 14

Line 26, "infocus" should read --in-focus--.

COLUMN 16

Line 60, "means" should read --means,--.

UNITED STATES PATENT AND TRADEMARK OFFICE
CERTIFICATE OF CORRECTION

PATENT NO. : 5,579,078

DATED : November 26, 1996

INVENTOR(S) : KENJI SUZUKI

It is certified that error appears in the above-indentified patent and that said Letters Patent is hereby corrected as shown below:

COLUMN 18

Line 25, "claim 30," should read --claim 35,--.
Line 30, "claim 35," should read --claim 40,--.
Line 35, "claim 35," should read --claim 40,--.
Line 66, "of corresponding" should read --corresponding--.

COLUMN 19

Line 6, "of corresponding" should read --corresponding.--

Signed and Sealed this

Sixth Day of May, 1997

Attest:

BRUCE LEHMAN

Attesting Officer

Commissioner of Patents and Trademarks